(12) United States Patent
Lee et al.

(10) Patent No.: US 6,850,300 B2
(45) Date of Patent: Feb. 1, 2005

(54) MULTI-DOMAIN LIQUID CRYSTAL DISPLAY DEVICE WITH PARTICULAR DIELECTRIC FRAMES

(75) Inventors: Joun Ho Lee, Taegukwangyokshi (KR); Doo Hyun Ko, Kumi-shi (KR); Dong Ho Kang, Kumi-shi (KR)

(73) Assignee: LG Philips LCD Co., Ltd., Seoul (KR)

( * ) Notice: Subject to any disclaimer, the term of this patent is extended or adjusted under 35 U.S.C. 154(b) by 17 days.

(21) Appl. No.: 09/750,073

(22) Filed: Dec. 29, 2000

(65) Prior Publication Data

US 2001/0019389 A1 Sep. 6, 2001

(30) Foreign Application Priority Data

Dec. 31, 1999 (KR) ........................................ 1999-67766

(51) Int. Cl.[7] .......................................... G02F 1/1337
(52) U.S. Cl. ...................................................... 349/129
(58) Field of Search ................................ 349/139–144, 349/129

(56) References Cited

U.S. PATENT DOCUMENTS

| | | | | |
|---|---|---|---|---|
| 5,608,556 A | * | 3/1997 | Koma | ........................ 349/143 |
| 6,081,315 A | * | 6/2000 | Matsuyama et al. | ........ 349/143 |
| 6,356,335 B1 | * | 3/2002 | Kim et al. | ................... 349/156 |
| 6,493,050 B1 | * | 12/2002 | Lien et al. | ................... 349/106 |
| 2001/0043305 A1 | * | 11/2001 | Ohmuro et al. | ............. 349/143 |

* cited by examiner

Primary Examiner—Kenneth Parker
Assistant Examiner—Timothy Rude
(74) Attorney, Agent, or Firm—McKenna Long & Aldridge LLP

(57) ABSTRACT

A multi-domain liquid crystal display device includes: first and second substrates; a plurality of gate lines on the first substrate in a first direction; a plurality of data lines formed in a second direction to cross the first direction; a plurality of thin film transistors formed in a portion where the gate lines cross the data lines; a plurality of pixel regions between neighboring gate and data lines; a common auxiliary electrode around each pixel region; a plurality of pixel electrodes formed in each pixel region to connect with the thin film transistor; dielectric structures on the second substrate, the dielectric structures being controlled electric field with the common auxiliary electrode and being divided the pixel region into at least four domains; at least one or more additional structures formed at an end portion of the dielectric structures within the pixel region; an alignment film on at least one of the first substrate and the second substrate; and a liquid crystal layer between the first substrate and the second substrate.

46 Claims, 9 Drawing Sheets

MULTI-DOMAIN LIQUID CRYSTAL DISPLAY DEVICE WITH PARTICULAR DIELECTRIC FRAMES

This application claims the benefit of Korean Patent Application No. P 1999-67766, filed on Dec. 31, 1999, which is hereby incorporated by reference.

BACKGROUND OF THE INVENTION

1. Field of the Invention

The present invention relates to relates to a liquid crystal display device, and more particularly, to a multi-domain liquid crystal display device in which a common auxiliary electrode is formed around and/or within a pixel region on a layer equal to a gate line, and a dielectric structure for distorting electric field, an additional dielectric structure or an electric field window are formed within the pixel region together with the common auxiliary electrode.

2. Discussion of the Related Art

Recently, a liquid crystal display device which drives a liquid crystal by an auxiliary electrode electrically insulated from a pixel electrode without aligning the liquid crystal has been suggested. Such a related art liquid crystal display device will be described with reference to FIG. 1.

FIG. 1 is a sectional view of a unit pixel of the related art liquid crystal display device.

As shown in FIG. 1, the related art liquid crystal display device includes a first substrate, a second substrate, a plurality of data lines and gate lines, a thin film transistor, a passivation film 37, a pixel electrode 13, and an auxiliary electrode 21. The data lines and gate lines are formed on the first substrate lengthwise and crosswise to divide the first substrate into a plurality of pixel regions. The thin film transistor is formed in each pixel region on the first substrate and includes a gate electrode, a gate insulating film, a semiconductor layer, an ohmic contact layer, and source/drain electrodes. The passivation film 37 is formed on the whole first substrate. The pixel electrode 13 is formed on passivation film 37 to be connected with the drain electrode. The auxiliary electrode 21 is formed on the gate insulating film to partially overlap the pixel electrode 13.

The related art liquid crystal display device further includes a light-shielding layer 25, a color filter layer 23 formed on the light-shielding layer 25, a common electrode 17 formed on the color filter layer 23, and a liquid crystal layer formed between the first substrate and the second substrate. The light-shielding layer is formed on the second substrate to shield light leaked from the gate lines, the data lines, and the thin film transistor.

An open region 27 may be formed in the common electrode 17 to distort electric field applied to the liquid crystal layer. The auxiliary electrode 21 formed around the pixel electrode 13 and the open region 27 of the common electrode 17 distort electric field applied to the liquid crystal layer so that liquid crystal molecules are variously driven within a unit pixel. This is intended that a dielectric energy by the distorted electric field places a liquid crystal director at a desired position when a voltage is applied to the liquid crystal display device.

However, the liquid crystal display device requires the open region 27 in the common electrode 17 to obtain multi-domain effect. To this end, a process for patterning the common electrode is additionally required.

Furthermore, if the open region 27 is not formed or has a small width, distortion range of the electric field required to divide the domain is weak. Accordingly, there is a problem that the time when the liquid crystal director reaches a stable state relatively becomes longer. Moreover, the electric field strongly occurs between the pixel electrode 13 and the auxiliary electrode 21. This increases luminance in only a portion, and also increases response time.

SUMMARY OF THE INVENTION

Accordingly, the present invention is directed to a multi-domain liquid crystal display device that substantially obviates one or more of the problems due to limitations and disadvantages of the related art.

An object of the present invention is to provide a multi-domain liquid crystal display device in which a common auxiliary electrode is formed around and/or within a pixel region on a layer equal to a gate line, and a dielectric structure for distorting electric field, an additional dielectric structure or an electric field window are formed within the pixel region together with the common auxiliary electrode.

Another object of the present invention is to provide a multi-domain liquid crystal display device which reduces response time of a liquid crystal layer and improves luminance.

Other object of the present invention is to provide a multi-domain liquid crystal display device which improves a viewing angle.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

A multi-domain liquid crystal display device of the present invention is an improved invention of the Korean Patent Application No. 1999-05587 filed by the same applicant of this invention, in which a common auxiliary electrode is formed around a pixel region on a layer equal to a gate line, and electric field induction windows are formed in the pixel region in a plurality of particular directions.

To achieve these and other advantages and in accordance with the purpose of the present invention, as embodied and broadly described, a multi-domain liquid crystal display device according to the present invention includes: first and second substrates; a plurality of gate lines on the first substrate in a first direction; a plurality of data lines formed in a second direction to cross the first direction; a plurality of thin film transistors formed in a portion where the gate lines cross the data lines; a plurality of pixel regions between neighboring gate and data lines; a common auxiliary electrode around each pixel region; a plurality of pixel electrodes formed in each pixel region to connect with the thin film transistor; dielectric structures on the second substrate, the dielectric structures being electric field with the common auxiliary electrode and being divided the pixel region into at least four domains; at least one or more additional structures at an end portion of the dielectric structures within the pixel region; an alignment film on at least one of the first substrate and the second substrate; and a liquid crystal layer between the first substrate and the second substrate.

The multi-domain liquid crystal display device further includes at least one or more electric field induction windows within the pixel region to compensate the dielectric structures. It is to be understood that both the foregoing general description and the following detailed description are exemplary and explanatory and are intended to provide further explanation of the invention as claimed.

BRIEF DESCRIPTION OF THE DRAWING

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
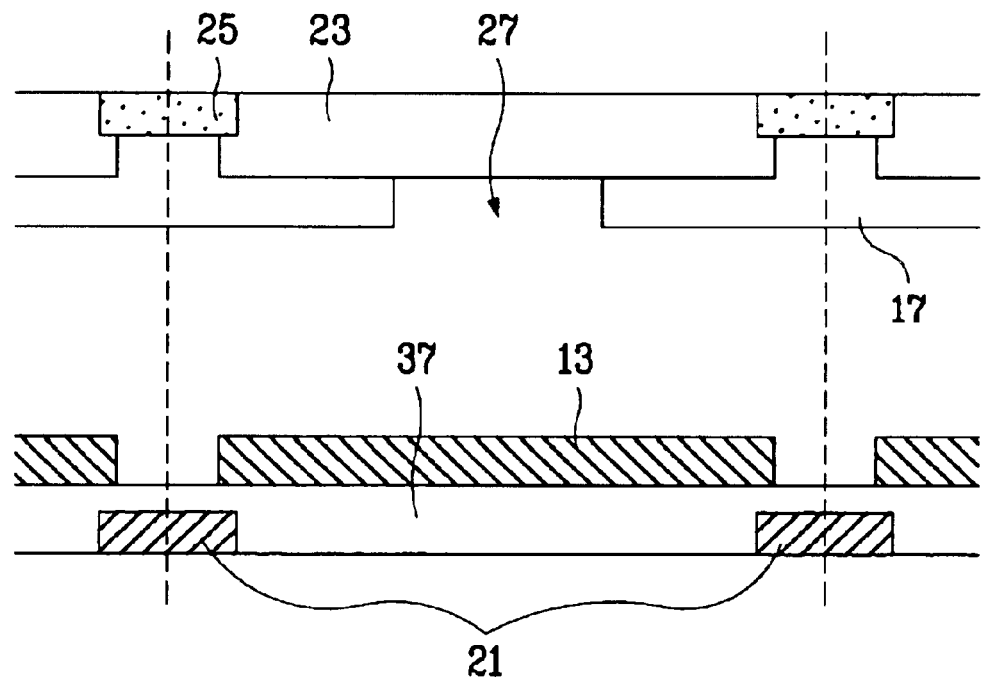
FIG. 1 is a sectional view showing a related art liquid crystal display device.
Figure 2:
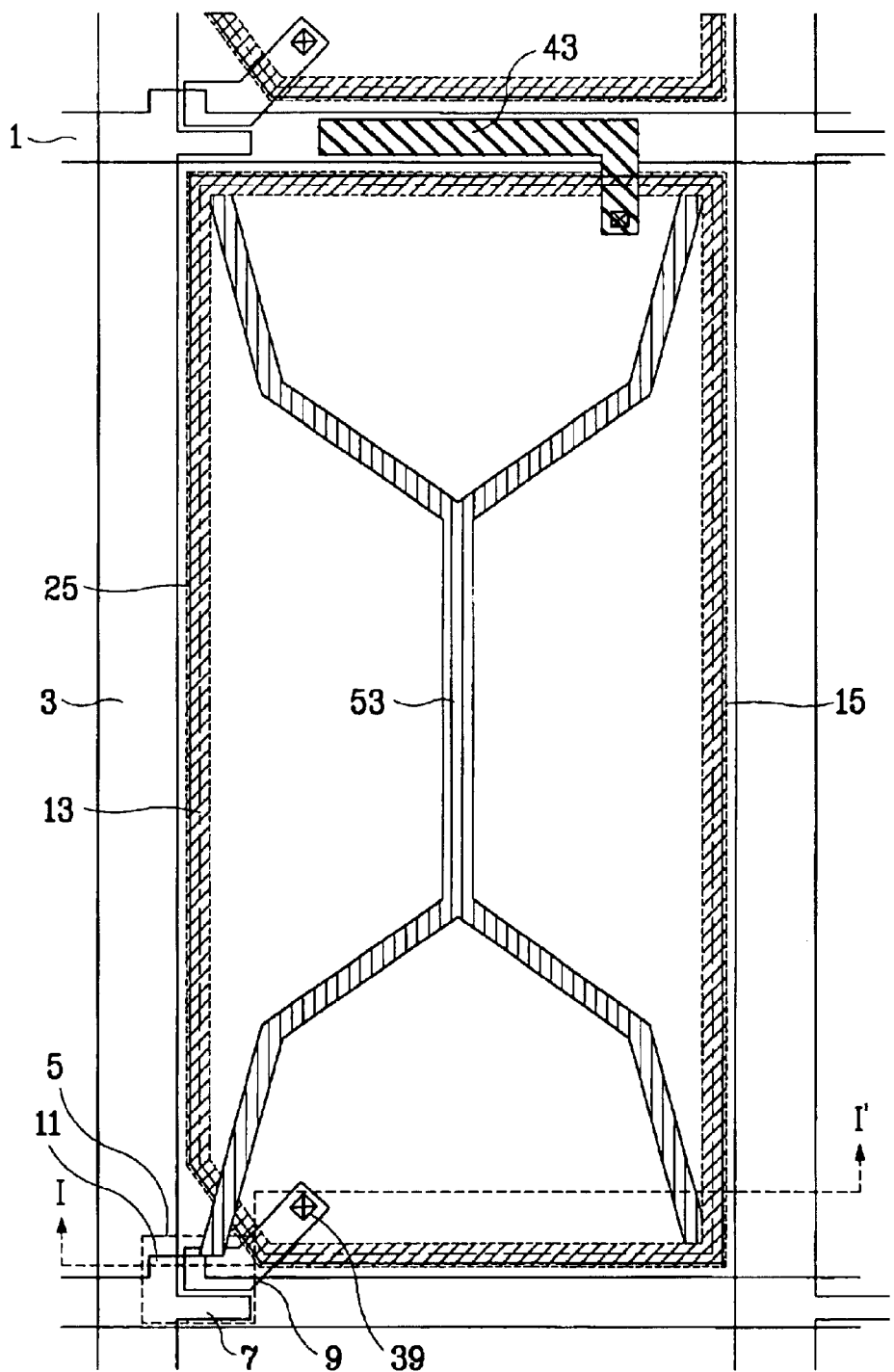
FIG. 2 is a plane view showing a multi-domain liquid crystal display device according to the first embodiment of the present invention.

FIG. 2 is a plane view showing a multi-domain liquid crystal display device according to the first embodiment of the present invention.

A multi-domain liquid crystal display device of the present invention includes a first substrate 31, a second substrate 33, a plurality of data lines 3 and gate lines 1, a common auxiliary electrode 15, a thin film transistor, a passivation film 37, and a pixel electrode 13.

The data lines 3 and gate lines 1 are formed on the first substrate 31 lengthwise and crosswise to divide the first substrate into a plurality of pixel regions. The common auxiliary electrode 15 is formed around and/or within the pixel regions on a layer equal to the gate lines. The thin film transistor is formed in each pixel region on the first substrate and includes a gate electrode 11, a gate insulating film 35, a semiconductor layer 5, an ohmic contact layer 6, and source/drain electrodes 7 and 9. The passivation film 37 is formed on an entire surface of the first substrate 31. The pixel electrode 13 is formed on the passivation film 37 to be connected with the drain electrode 9.

Figure 3:
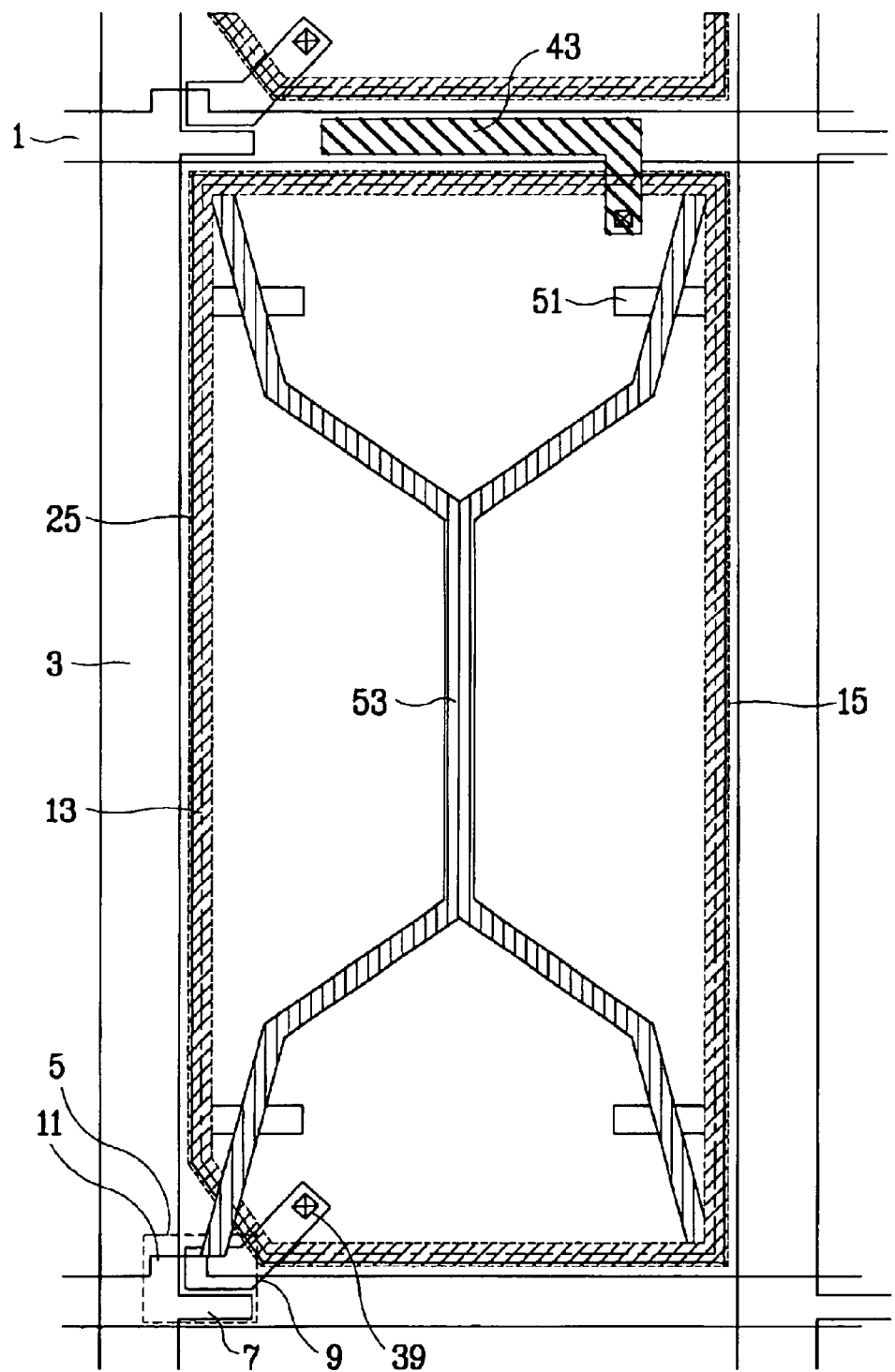
FIG. 3 is a plane view showing a multi-domain liquid crystal display device according to the second embodiment of the present invention.

The multi-domain liquid crystal display device further includes at least one or more electric field induction windows 51 in a corner portion within the pixel electrode 13 to compensate the electric field applied and induced to the common auxiliary electrode 15 and the pixel electrode 13 (see FIG. 3).

The electric field induction windows 51 acts to decrease disclination portion, so the brightness and the response time can be improved.

The multi-domain liquid crystal display device further includes a light-shielding layer 25, a color filter layer 23 formed on the light-shielding layer 25, a common electrode 17 formed on the color filter layer 25, and a liquid crystal layer formed between the first substrate 31 and the second substrate 33. The light-shielding layer 25 is formed on the second substrate 33 to shield light leaked from the gate lines 1, the data lines 3 and the thin film transistor.

Dielectric structures 53 of double Y shapes with curve portions are formed on the common electrode 17 and acts to remove disclination generated due to uneven electric field applied to the related art common electrode and pixel electrode (see FIG. 2). Also, in addition to the dielectric structures, at least one or more additional dielectric structures 53a may be formed on the common electrode 17 to compensate the electric field induced to the corner portion of the pixel region.

Figure 4:
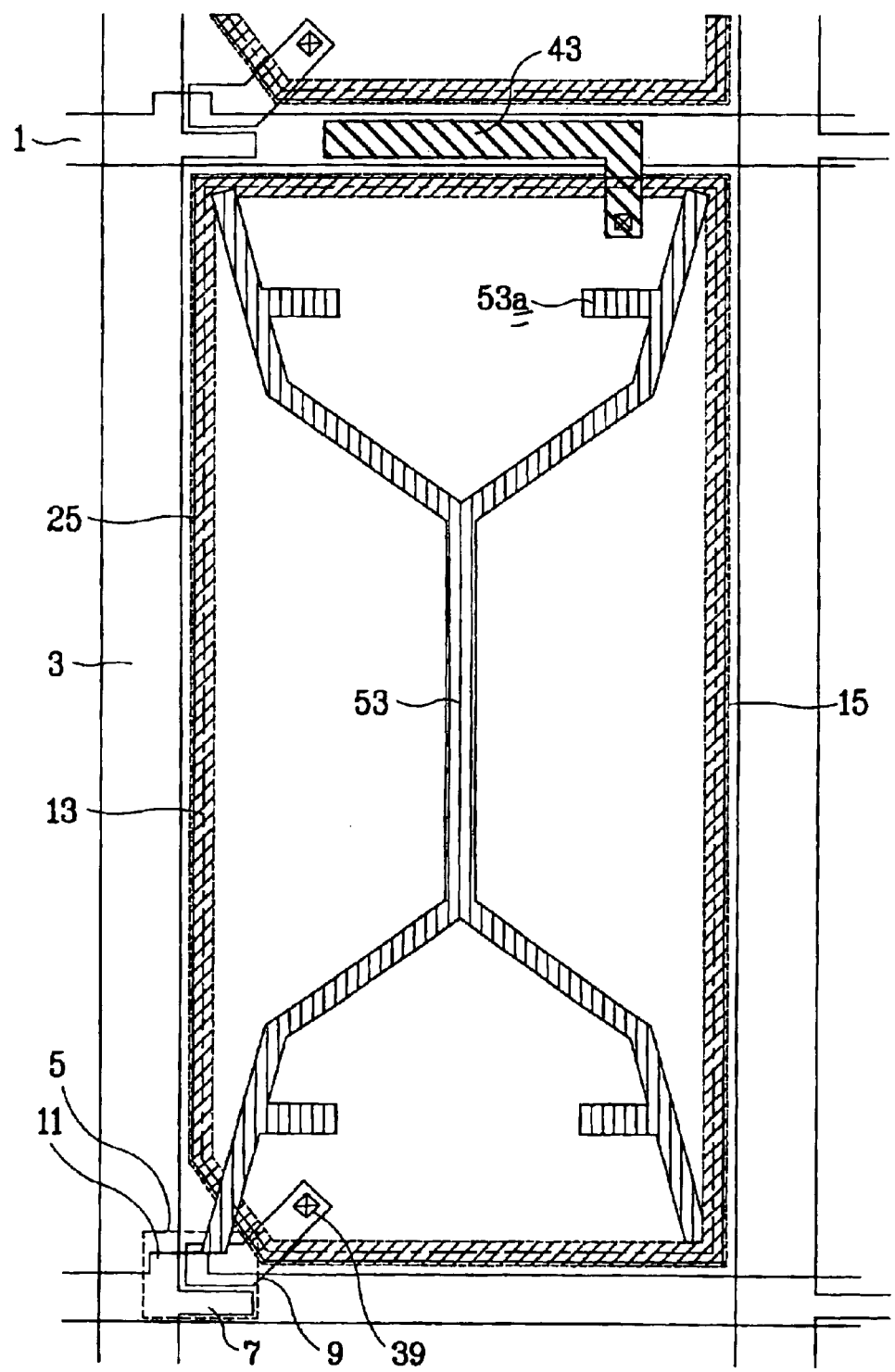
FIG. 4 is a plane view showing a multi-domain liquid crystal display device according to the third embodiment of the present invention.

The dielectric structures include a first region formed in one direction within the pixel region, and second and third regions respectively divided from an end portion of the first region (see FIG. 4).

The end portion of the dielectric structures 53 acts to remove disclination due to uneven electric field, so the flicker is prevented and the brightness is increased.

Figure 5A:
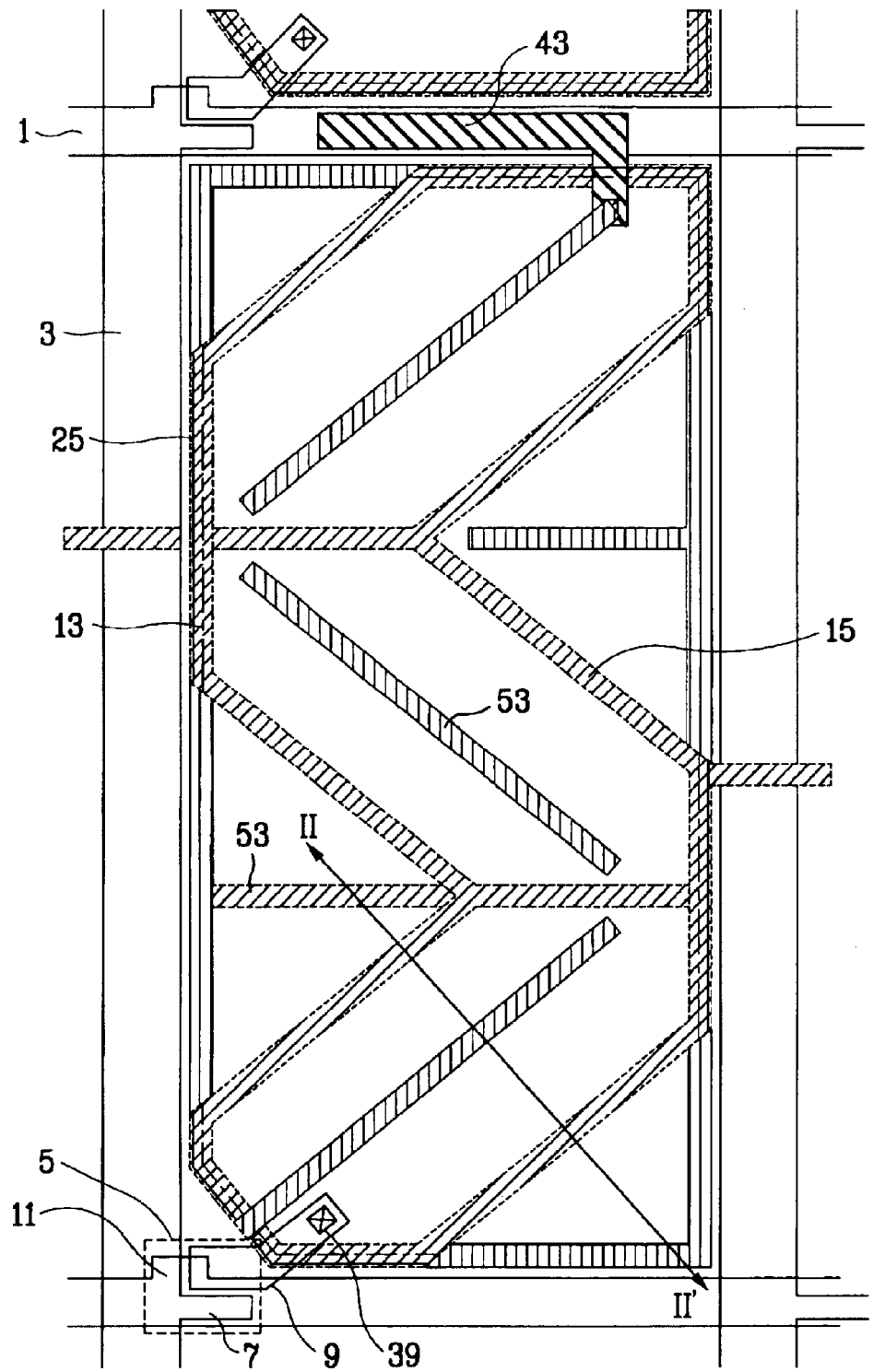
FIGS. 5a and 5b are a plane view showing a multi-domain liquid crystal display device according to the fourth embodiment of the present invention.

In the fourth embodiment of the present invention shown in FIG. 5, one pixel is divided into three parts, and the common auxiliary electrode 15 is formed within each part in a hexagonal shape. At the same time, the dielectric structures 53 are formed in a portion, where the common auxiliary electrode 15 is not formed, on the second substrate. Thus, more improved multi-domain effect can be obtained.

Namely, each part is defined by the dielectric structures 53 formed in a diagonal direction of each corresponding part and the common auxiliary electrode 15 formed in a hexagonal shape around the dielectric structures. The dielectric structures 53 are formed in a zig-zag shape along with a neighboring dielectric structure. So, the zig-zag shape acts to have an uniform electric field distortion, and the aperture ratio and the response time can be improved.

Figure 5B:
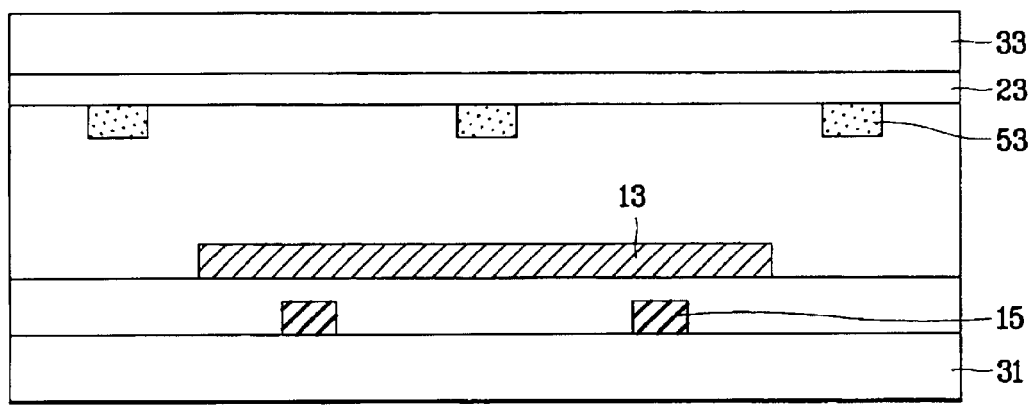

Meanwhile, the common auxiliary electrode 15 has an extension portion to be connected with a neighboring common auxiliary electrode 15. FIG. 5b is a sectional view taken along line II—II' of FIG. 5a.

In the fourth embodiment, the dielectric structures on the second substrate may have hole or slit shapes to act as the electric field windows.

FIGS. 6a to 6e are sectional views taken along line I—I' of FIG. 2, showing a method for fabricating a multi-domain liquid crystal display device according to the present invention.

To fabricate the aforementioned multi-domain liquid crystal display device, the thin film transistor consisting of the gate electrode 11, the gate insulating film 35, the semiconductor layer 5, the ohmic contact layer 6 and the source/drain electrodes 7 and 9 is formed in each pixel region of the first substrate 31. At this time, the plurality of gate lines 1 and data lines 3 are formed to divide the first substrate 31 into a plurality of pixel regions.

Figure 6A:
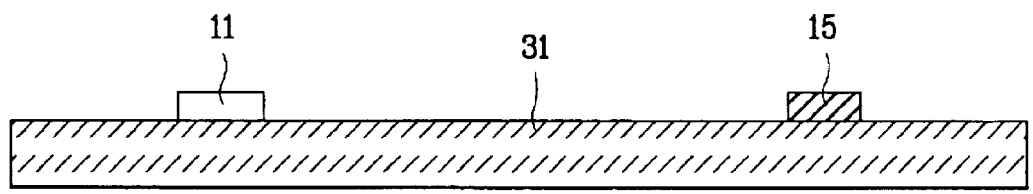
FIGS. 6a to 6e are sectional views taken along line I—I' of FIG. 2, showing a method for fabricating a multi-domain liquid crystal display device according to the present invention.

The gate electrode 11 and the gate lines 1 are formed in such a manner that a metal such as Al, Mo, Cr, Ta, Al alloy, or their double layer is layered by sputtering method and patterned. At the same time, the common auxiliary electrode 15 is formed in one pixel to have at least one or more electrodes, and conducted to the common auxiliary electrode of a neighboring pixel (FIG. 6a).

When the common auxiliary electrode 15 is formed of the same material as that of the gate lines 1, the common auxiliary electrode 15 is formed on the same layer as the gate lines 1 using the same mask and electrically connected with the common electrode 17. Alternatively, the common auxiliary electrode 15 may be formed of a metal different from the material of the gate lines using an additional mask. Also, the common auxiliary electrode 15 may be formed of a double layer with different materials.

Subsequently, the gate insulating film 35 is formed in such a manner that $SiN_x$ or $SiO_x$ is deposited on the common auxiliary electrode 15 and the gate lines 1 by plasma enhancement chemical vapor deposition (PECVD) method. To improve aperture ratio, benzocyclobutene(BCB), acrylic resin, or polyimide(Pl) compound may be used as the gate insulating film 35.

Figure 6B:
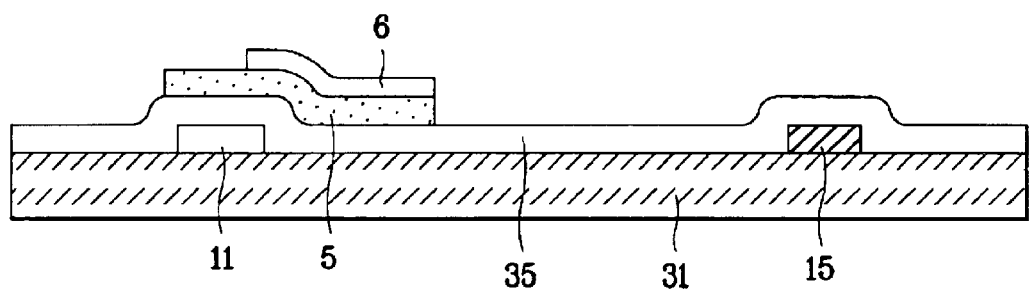

Subsequently, the semiconductor layer 5 and the ohmic contact layer 6 are formed in such a manner that a-Si and $n^+$ a-Si are deposited by the PECVD method and patterned (FIG. 6b). Alternatively, the semiconductor layer 5 and the ohmic contact layer 6 are formed in such a manner that a-Si and $n^+$ a-Si are patterned after $SiN_x$ or $SiO_x$, a-Si and $n^+$ a-Si are successively deposited to form the gate insulating film 35.

Figure 6C:
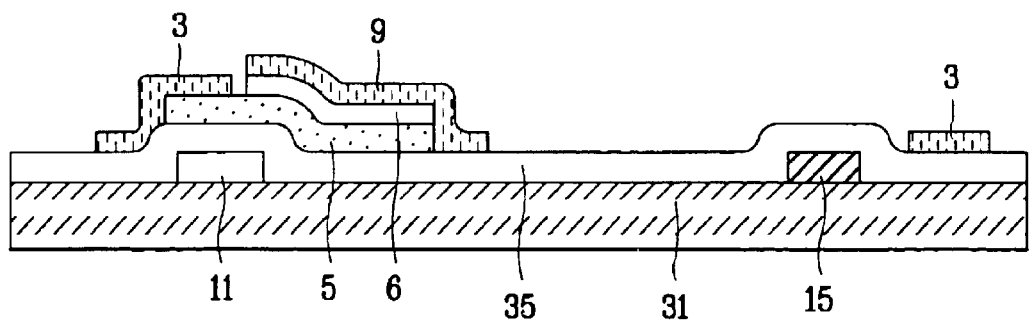

A metal such as Al, Mo, Cr, Ta, Al alloy, or their double layer is layered by the sputtering method and then patterned so that the data lines 3 and the source/drain electrodes 7 and 9 are formed (FIG. 6c). At this time, a storage electrode 43 is formed to overlap the gate lines 1 and/or the common auxiliary electrode 15. The storage electrode 43 acts as a storage capacitor together with the gate lines 1 and/or the common auxiliary electrode 15.

Figure 6D:
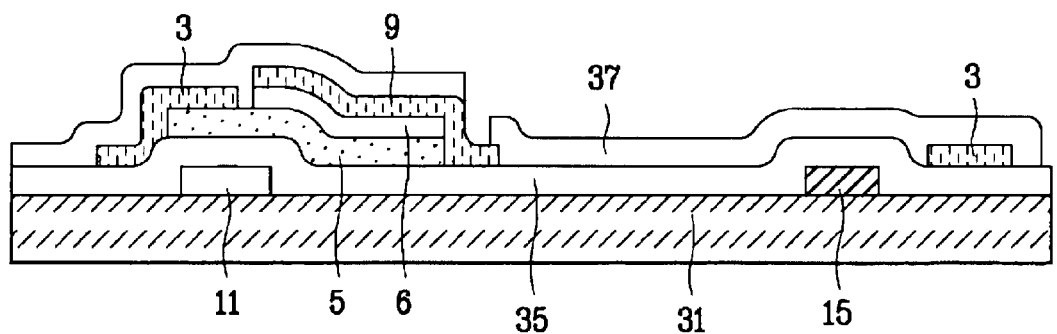

Subsequently, the passivation film 37 is formed of a material such as BCB, acrylic resin, polyimide compound, $SiN_x$ or $SiO_x$ on the whole first substrate 31. An indium tin oxide(ITO) is deposited by the sputtering method and patterned to form the pixel electrode 13 (FIG. 6d).

FIG. 6 shows a case where the passivation film 37 is SiNx or SiOx. In case where BCB, acrylic resin or polyimide compound is used as the passivation film 37, planation of the surface can be obtained and at the same time aperture ratio can be improved.

Figure 6E:
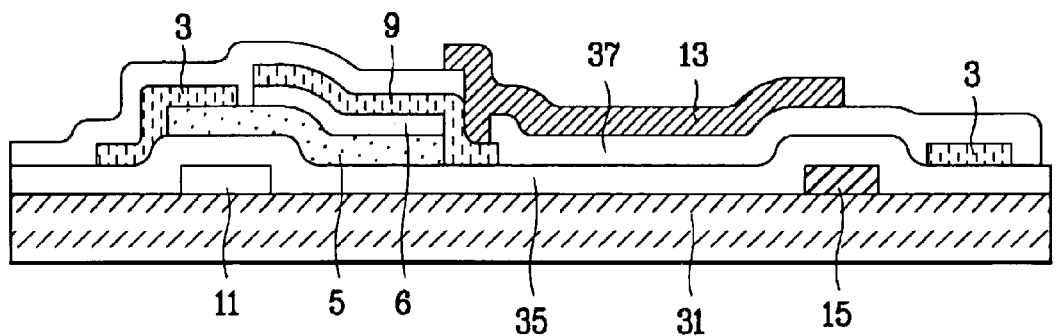

The storage electrode 43 is extended toward the pixel electrode 13 to partially overlap the pixel electrode 13, and a contact hole 39 is formed by removing the passivation film beneath the overlap portion. Thus, the pixel electrode 13 is electrically connected with the storage electrode 43. Furthermore, the passivation film on the drain electrode 9 is selectively removed to form the contact hole 39 so that the pixel electrode 13 is connected with the drain electrode 9 through the contact hole 39 (FIG. 6e).

At the same time, at least one or more additional electric field induction windows 51 are formed in the corner portion within the pixel electrode 13. The electric field induction window acts to compensate the electric field formed by the common auxiliary electrode 15 so that a stable liquid crystal structure can be obtained when driving the liquid crystal display device. Thus, response time of the liquid crystal display device can be reduced.

Additionally, an alignment film (not shown) may be formed on the pixel electrode 13.

In the embodiments of the multi-domain liquid crystal display device according to the present invention, L-lined thin film transistor structure of high aperture ratio is provided. By forming the L-lined thin film transistor on the gate lines 1, aperture ratio can be improved as compared with the related art liquid crystal display device and parasitic capacitance generated between the gate line 1 and the drain electrode 9 can be reduced.

The light-shielding layer 25 is formed on the second substrate 33, and the color filter layer 23 is formed to repeat R(red), G(green) and B(blue) elements for each pixel. The common electrode 17 is formed of a transparent electrode such as ITO on the color filter layer 23, in the same manner as the pixel electrode 13. A photoresist material is deposited on the common electrode 17 and patterned by photolithography to form dielectric structures 53 having various shapes. Additionally, an alignment film (not shown) may be formed on the dielectric structures 53.

Subsequently, a liquid crystal is injected between the first substrate 31 and the second substrate 33 so that a multi-domain liquid crystal display device is completed. The liquid crystal constituting the liquid crystal layer has a positive dielectric anisotropy or a negative dielectric anisotropy. The liquid crystal may include a chiral dopant.

Preferably, the dielectric structures 53 have dielectric constants equal to or smaller than the liquid crystal layer, and more preferably 3 or below. A material such as photoacrylate or BCB may be used as the dielectric structures.

To apply a voltage $V_{com}$ to the common auxiliary electrode 15, an Ag-Dotting portion is formed in each corner of a driving region of the liquid crystal display device on the first substrate 31, and the electric field is applied to the second substrate 33 to drive the liquid crystal by the potential difference between upper and lower substrates. The Ag-Dotting portion of each corner is connected with the common auxiliary electrode 15. Thus, the voltage $V_{com}$ is applied to the common auxiliary electrode 15. This process is performed when forming the common auxiliary electrode 15.

Figure 7:
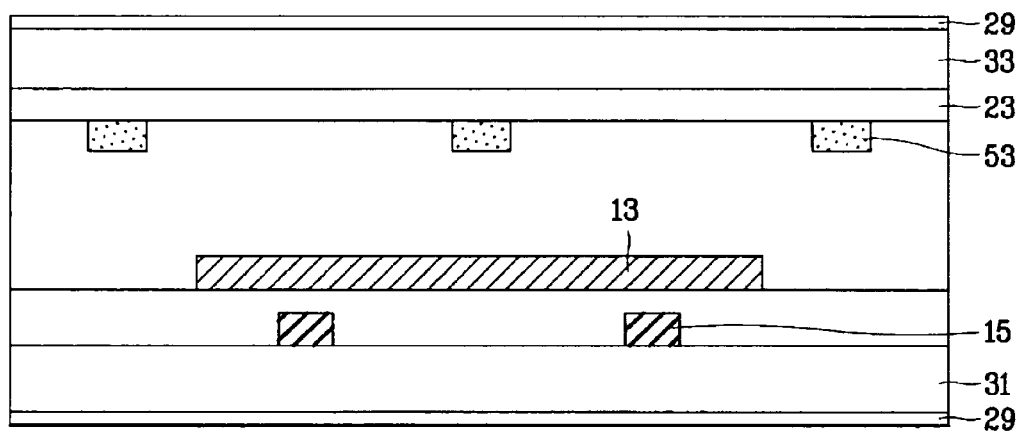
FIG. 7 is a plane view showing a multi-domain liquid crystal display device applying to phase difference film.

High molecules are formed on at least one of the first substrate 31 and the second substrate 33 so that a phase difference film 29 is formed.(as shown in FIG. 7.)

The phase difference film 29 is a negative uniaxial film and acts to compensate a viewing angle of a user. Therefore, a region having no gray inversion is expanded, contrast ratio in tilt direction increases, and a multi-domain is formed by one pixel. Thus, a viewing angle in left and right direction can effectively be compensated.

In addition to the negative uniaxial film, a negative biaxial film may be formed as the phase difference film 29. The negative biaxial film having two axes can obtain viewing angle characteristic wider than the negative uniaxial film.

Subsequently, a polarizer (not shown) is attached on both substrates. The polarizer may be formed in an integral form with the phase difference film.

In the multi-domain liquid crystal display device of the present invention, the dielectric structures 53 are formed on the pixel electrode and/or the common electrode, or the pixel electrode, the passivation film, the gate insulating film, the color filter layer, the overcoat layer, and/or the common electrode are patterned to form the electric field induction windows 51 such as a hole or slit therein. Thus, electric field distortion effect and multi-domain effect can be obtained.

Four-domain or multi-domain effect can be obtained by the electric field induction windows 51 or the dielectric structures 53. The electric field induction windows 51 or the dielectric structures 53 may be formed on at least one of the first substrate and the second substrate, or independently or together on both substrates.

Additionally, in the multi-domain liquid crystal display device of the present invention, an alignment film (not shown) is formed over the first substrate and/or the second substrate.

Polyamide or polyimide based compound, polyvinyalcohol(PVA), polyamic acid, or $SiO_2$ is used as an alignment material of the alignment film. In case where rubbing method is used to determine alignment direction, a material suitable for the rubbing method may be used as the alignment material of the alignment film.

Furthermore, a photo alignment film of a material such as polyvinylcinnamate(PVCN), polysiloxanecinnamate (PSCN), cellulosecinnamate(CelCN), or their based compound may be formed. The other materials suitable for photo-alignment may be used as the alignment film.

Light is irradiated to the photo-alignment film at least one time to determine a pretilt angle and alignment direction or pretilt direction of the director of the liquid crystal molecule at the same time, thereby obtaining stable alignment of the liquid crystal. The light used for the photo-alignment is suitable for light in an ultraviolet ray region. Non-polarized light, linearly-polarized light, unpolarized light, or partially polarized light may be used for the photo-alignment.

The rubbing method or the photo-alignment method is applicable to one of the first substrate and the second substrate or both substrates. Different alignment methods are applicable to both substrates. Although the alignment film has been formed, alignment process may not be performed.

Furthermore, the aforementioned alignment is performed to form the multi-domain liquid crystal display device divided into at least two regions. Thus, the liquid crystal molecule of the liquid crystal layer may be aligned differently on each region. In other words, each pixel is divided into four regions in+shape or X shape, or each pixel is divided in horizontal, vertical, or diagonal direction. Alignment process or alignment direction is varied depending on each region and each substrate, so that multi-domain effect can be realized. At least one region of the divided regions may be a non-alignment region or all the divided regions may be a non-alignment region.

As aforementioned, the multi-domain liquid crystal display device has the following advantages.

The common auxiliary electrode is formed around and/or within the pixel region on the same layer as the gate lines, and the dielectric structures for distorting the electric field together with the common auxiliary electrode and additional dielectric structures or the electric field induction windows for compensating the dielectric structures are formed within the pixel region. Thus, response time of the liquid crystal layer can be reduced and luminance can be improved, thereby maximizing the multi-domain effect.

Also, gray inversion and disclination generated in the related art liquid crystal display device can be removed. Particularly, the viewing angle can effectively be ensured in left and right direction.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A multi-domain liquid crystal display device comprising:
   a first substrate defined by a plurality of pixel regions;
   a common auxiliary electrode around each pixel region on the first substrate;
   a dielectric structure on a second substrate, the dielectric structure dividing each pixel region into a plurality of domains;
   at least one or more additional structures formed at an end portion of the dielectric structure within the pixel region; and
   a liquid crystal layer between the first substrate and the second substrate.

2. The multi-domain liquid crystal display device of claim 1, further comprising:
   a plurality of gate lines on the first substrate in a first direction;
   a plurality of data lines formed in a second direction to cross the first direction;
   thin film transistors formed in a portion where the gate lines cross the data lines; and
   a pixel electrode connected with the thin film transistors in the pixel region defined by the gate lines and the data lines.

3. The multi-domain liquid crystal display device of claim 1, further comprising an alignment film on at least one of the first substrate and the second substrate.

4. The multi-domain liquid crystal display device of claim 1, wherein the common auxiliary electrode is formed with gate lines.

5. The multi-domain liquid crystal display device of claim 1, wherein the common auxiliary electrode is not formed with the gate lines.

6. The multi-domain liquid crystal display device of claim 1, wherein liquid crystal molecules within each domain have different alignment directions.

7. The multi-domain liquid crystal display device of claim 1, wherein the dielectric structure includes a first region formed in one direction within the pixel region, and second and third regions respectively divided from an end portion of the first region.

8. The multi-domain liquid crystal display device of claim 1, wherein the dielectric structure includes an electric field induction window.

9. The multi-domain liquid crystal display device of claim 8, wherein the electric field induction window includes a hole or slit.

10. The multi-domain liquid crystal display device of claim 1, wherein the additional structure is at least one electric field induction window or dielectric structure.

11. The multi-domain liquid crystal display device of claim 1, further comprising a phase difference film on at least one of the first and second substrates.

12. A multi-domain liquid crystal display device comprising:
   first and second substrates;
   a plurality of gate lines on the first substrate in a first direction;
   a plurality of data lines formed in a second direction to cross the first direction;
   a plurality of thin film transistors formed in a portion where the gate lines cross the data lines;
   a plurality of pixel regions between neighboring gate and data lines;
   a common auxiliary electrode around each pixel region;
   a plurality of pixel electrodes formed in each pixel region to connect with the thin film transistors;
   a dielectric structure on the second substrate, the dielectric structure being applied electric field with the common auxiliary electrode and being divided the pixel region into at least four domains;
   at least one or more additional structures formed at an end portion of the dielectric structure within the pixel region;

an alignment film on at least one of the first substrate and the second substrate; and a liquid crystal layer between the first substrate and the second substrate.

13. The multi-domain liquid crystal display device of claim 12, further comprising a phase difference film on at least one of the first and second substrates.

14. The multi-domain liquid crystal display device of claim 12, wherein each pixel region is divided into at least three domains.

15. The multi-domain liquid crystal display device of claim 12, wherein the dielectric structures have a zig-zag shape.

16. The multi-domain liquid crystal display device of claim 12, wherein the common auxiliary electrodes have an extension portion electrically connected with the common auxiliary electrode of a neighboring pixel region.

17. The multi-domain liquid crystal display device of claim 1, wherein the additional structure is on the dielectric structure.

18. A multi-domain liquid crystal display device, comprising:

first and second substrates;

a plurality of data lines in a first direction and a plurality of gate lines in a second direction on the first substrate, the first direction intersecting the second direction;

a plurality of pixel regions between the data lines and the gate lines;

a thin film transistor in each of the pixel regions;

a common auxiliary electrode around each respective pixel region;

a dielectric structure in at least one of the pixel regions, the dielectric structure having two end portions and a middle portion, the end portions each having a U shape with an apex, the apexes connected to one another by the middle portion; and a liquid crystal layer between the first and second substrates.

19. The multi-domain liquid crystal display device of claim 18, further comprising at least one electric field induction window in a corner portion of at least one of the pixel regions.

20. The multi-domain liquid crystal display device of claim 18, further comprising a common electrode in the at least one pixel region wherein the dielectric structure is on the common electrode.

21. The multi-domain liquid crystal display device of claim 18, further comprising a common electrode in the at least one pixel region and additional dielectric structures on the common electrode in a corner of the at least one pixel region.

22. The multi-domain liquid crystal display device of claim 18, wherein at least one of the two end portions further comprises a projection.

23. The multi-domain liquid crystal display device of claim 18, wherein the at least one pixel region is divided into first, second and third regions by the dielectric structure.

24. The multi-domain liquid crystal display device of claim 23, wherein the first region is formed in one portion of the at least one pixel region, and the second and third regions are separated from an end part of the first region.

25. The multi-domain liquid crystal display device of claim 18, wherein the dielectric structure has a dielectric constant of 3 or less.

26. The multi-domain liquid crystal display device of claim 18, further comprising an alignment film on at least one of the first and second substrates.

27. The multi-domain liquid crystal display device of claim 18, wherein the dielectric structure includes at least one electric field induction window.

28. The multi-domain liquid crystal display device of claim 27, wherein the electric field induction window includes a slit.

29. The multi-domain liquid crystal display device of claim 18, further comprising a phase difference film on at least one of the first and second substrates.

30. The multi-domain liquid crystal display device of claim 18, further comprising at least one or more additional structures formed at an end portion of the dielectric structure within the pixel region.

31. A multi-domain liquid crystal display device, comprising:

first and second substrates;

a plurality of data lines in a first direction and a plurality of gate lines in a second direction on the first substrate, the first direction intersecting the second direction;

a plurality of pixel regions between the data lines and the gate lines;

a thin film transistor in each of the pixel regions;

a common auxiliary electrode around each respective pixel region;

at least one electric field induction window in a corner portion of at least one of the pixel regions; and a liquid crystal layer between the first and second substrates.

32. The multi-domain liquid crystal display device of claim 31, further comprising an alignment film on at least one of the first and second substrates.

33. The multi-domain liquid crystal display device of claim 31, wherein the electric field induction window includes a slit.

34. The multi-domain liquid crystal display device of claim 31, further comprising a phase difference film on at least one of the first and second substrates.

35. The multi-domain liquid crystal display device of claim 31, further comprising a dielectric structure on the second substrate, the dielectric structure dividing each pixel region into a plurality of domains; and at least one or more additional structures formed at an end portion of the dielectric structure with the pixel region.

36. A multi-domain liquid crystal display device, comprising:

first and second substrates;

a plurality of data lines in a first direction and a plurality of gate lines in a second direction on the first substrate, the first direction intersecting the second direction;

a plurality of pixel regions between the data lines and the gate lines, at least one of the pixel regions including three subregions;

a common auxiliary electrode within each subregion, the common auxiliary electrode having a hexagonal shape;

a thin film transistor in each of the pixel regions; and a liquid crystal layer between the first and second substrates.

37. The multi-domain liquid crystal display device of claim 36, further comprising dielectric structures in each subregion, wherein the dielectric structures do not overlap the common auxiliary electrode.

38. The multi-domain liquid crystal display device of claim 37, wherein the dielectric structures are diagonal with respect to a corresponding subregion.

39. The multi-domain liquid crystal display device of claims 37, wherein the dielectric structures each have a zig-zag shape.

40. The multi-domain liquid crystal display device of claim 37, wherein the dielectric structures each include a cut out portion.

41. The multi-domain liquid crystal display device of claim 37, wherein the dielectric structures have a dielectric constant of 3 or less.

42. The multi-domain liquid crystal display device of claim 37, wherein the dielectric structures each include at least one electric field induction window.

43. The multi-domain liquid crystal display device of claim 42, wherein the electric field induction window includes a slit.

44. The multi-domain liquid crystal display device of claim 36, further comprising an alignment film on at least one of the first and second substrates.

45. The multi-domain liquid crystal display device of claim 36, further comprising a phase difference film on at least one of the first and second substrates.

46. The multi-domain liquid crystal display device of claim 36, further comprising a dielectric structure on the second substrate, the dielectric structure dividing each pixel region into a plurality of domains; and at least one or more additional structures formed at an end portion of the dielectric structure with the pixel region.

* * * * *